(12) United States Patent
Chen

(10) Patent No.: US 6,322,155 B1
(45) Date of Patent: Nov. 27, 2001

(54) HUB TRANSMISSION MECHANISM WITH A SEAL MEMBER

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 09/634,442

(22) Filed: Aug. 8, 2000

(51) Int. Cl.[7] .............................. B60B 27/00; F16D 41/30
(52) U.S. Cl. ..................... 301/110.5; 192/64; 384/484; 277/529
(58) Field of Search ............................ 301/110.5, 110.6, 301/59; 192/64; 384/484; 277/381, 529, 530

(56) References Cited

U.S. PATENT DOCUMENTS

| 4,567,973 | * | 2/1986 | Butz | 192/64 |
| 5,370,404 | * | 12/1994 | Klein et al. | 277/381 |
| 5,632,364 | * | 5/1997 | Mercat | 192/64 |
| 5,642,796 | * | 7/1997 | Tabe | 192/64 |
| 6,062,734 | * | 5/2000 | Bundgart | 384/477 |
| 6,202,813 | * | 3/2001 | Yahata et al. | 192/64 |

* cited by examiner

Primary Examiner—Russell D. Stormer
(74) Attorney, Agent, or Firm—Ohlandt, Greeley, Ruggiero & Perle, L.L.P.

(57) ABSTRACT

A hub transmission mechanism includes an axle extending through a spoke-mounting barrel such that a right axle portion thereof extends outwardly from the spoke-mounting barrel. A sprocket-mounting member is sleeved around the right axle portion, and includes an outer shell coupled with the spoke-mounting barrel, a bearing unit disposed within the outer shell around the axle, and a bearing retention member that is disposed in the outer shell around the axle outboard to the bearing unit. A flexible seal member is disposed within the outer shell between the bearing unit and an outward flange of the bearing retention member, and includes an L-shaped cross-sectioned outer ring which is in tight engagement with the outer shell and which has a thick left portion and a thin right portion that is thinner than the thick left portion and that has an inner diameter larger than that of the thick left portion. The seal member further includes a truncated conical inner ring which projects inclinedly and inwardly from the thick left portion of the outer ring and which has a smallest inner diameter right end that is sleeved slidably over the bearing retention member adjacent to the outward flange.

4 Claims, 5 Drawing Sheets

HUB TRANSMISSION MECHANISM WITH A SEAL MEMBER

BACKGROUND OF THE INVENTION

1. Field of the Invention

The present invention relates to a bicycle transmission mechanism, more particularly to a bicycle hub transmission mechanism with a seal member.

2. Description of the Related Art

Referring to FIG. 1, a conventional free-wheel hub transmission mechanism is shown to include an axle 2 and a spoke-mounting barrel 1 mounted rotatably around the axle 2 in such a manner that a right axle portion 2R of the axle 2 projects outwardly from a right end portion 100 of the spoke-mounting barrel 1. A sprocket mounting member 3 is sleeved around the right axle portion 2R of the axle 2 adjacent to the right end portion 100 of the spoke-mounting barrel 1. The sprocket-mounting member 3 includes an outer shell 31, a bearing unit 4, a ratchet mechanism 7, a bearing retention member 5, a seal member 6, and a locking ring 302.

The outer shell 31 has a proximate end portion which is coupled with the right end portion 100 of the spoke-mounting barrel 1 and upon which a sprocket wheel 301 is mounted (only one is shown), and a distal threaded portion 303. The bearing unit 4 is disposed within the outer shell 31 around the right axle portion 2R of the axle 2 inboard to the distal threaded portion 303 of the outer shell 31. The ratchet mechanism 7 is disposed within the outer shell 31 inboard to the bearing unit 4, and is operably coupled with the outer shell 31 so as to permit synchronous rotation of the outer shell 31 with the spoke-mounting barrel 1 only in a forward direction. The bearing retention member 5 is sleeved fittingly around the right axle portion 2R of the axle 2 outboard to the bearing unit 4, and has a cross section smaller than that of the outer shell 31, thereby defining annular space (X) therebetween. The bearing retention member 5 further has a constricted left portion 505 that abuts against the bearing unit 4, and an enlarged right portion 506 which defines an inner shoulder 500 in cooperation with the constricted left portion 505. The locking ring 302 is sleeved around the bearing retention member 5, and is fastened threadedly to the distal threaded portion 303 of the outer shell 31. A rear fork member (not shown) abuts against a right end surface of the bearing retention member 5 to prevent removal of the bearing retention member 5 from the axle 2. The seal member 6 is disposed within the outer shell 31 between the bearing unit 4 and the inner shoulder 500 of the bearing retention member 5, and includes an L-shaped cross-sectioned metal ring 601 which is in tight engagement with the constricted left portion 505 of the bearing retention member 5, and a rubber ring 602 provided on the metal ring 601 in such a manner that the outer periphery of the rubber ring 602 contacts an inner wall surface of the distal threaded portion 303 of the outer shell 31 such that the seal member 6 isolates hermetically the annular space (X) with respect to the bearing unit 4.

When the outer shell 31 rotates with respect to the axle 2, a small clearance may be present between the outer periphery of the rubber ring 602 and the inner wall surface of the outer shell 31 in the event that the outer periphery of the rubber ring 602 does not contact any crest of the thread, and rather extends into a root of the thread. Under this condition, dust, oil and water may enter the interior of the outer shell 31 via the clearance.

In order to avoid the aforesaid disadvantage, a larger rubber ring has been proposed such that the outer periphery of the rubber ring 602 will tightly contact the inner wall surface of the outer shell 31 of the sprocket-mounting member 3. However, a considerable friction force is incurred between the outer shell 31 and the rubber ring 602 during rotation of the outer shell 31, thereby hindering smooth rotation of the sprocket-mounting member 3 relative to the axle 2.

SUMMARY OF THE INVENTION

Therefore, the object of this invention is to provide a bicycle hub transmission mechanism which includes a flexible seal member of a specific configuration so as to avoid the aforesaid disadvantages that result from the use of the conventional bicycle hub transmission mechanism.

Accordingly, a bicycle hub transmission mechanism of the present invention includes an axle with left and right axle portions, a tubular spoke-mounting barrel, and a sprocket-mounting member. The spoke-mounting barrel defines an axially extending through-hole therethrough and has left and right end portions. The axle extends co-axially through the through-hole of the barrel with the right axle portion projecting outwardly from the right end portion of the barrel. The sprocket-mounting member is sleeved around the right axle portion of the axle adjacent to the right end portion of the barrel, and includes an outer shell coupled with the right end portion of the barrel for synchronous rotation therewith. The outer shell has a distal end portion upon which a sprocket wheel is adapted to be mounted. A bearing unit is disposed within the outer shell around the right axle inboard to the distal end portion of the outer shell. A ratchet mechanism is disposed within the outer shell inboard to the bearing unit, and is operably coupled with the outer shell so as to permit synchronous rotation of the outer shell with the barrel only in a forward direction. A bearing retention member is sleeved and positioned around the right axle portion outboard to the bearing unit. The bearing retention member has a cross section smaller than that of the outer shell to define an annular space between the bearing retention member and the outer shell. The bearing retention member further has a left portion abutting against the bearing unit, a right portion opposite to the left portion, and an annular outward flange formed between the left and right portions of the bearing retention member. The outward flange extends radially and outwardly into the annular space, and defines an inner shoulder in cooperation with the left portion of the bearing retention member. A tubular flexible seal member is disposed within the outer shell between the bearing unit and the outward flange of the bearing retention member. The flexible seal member includes an L-shaped cross-sectioned outer ring which is in tight engagement with the outer shell and which has a thick left portion and a thin right portion that is thinner than the thick left portion and that has an inner diameter larger than that of the thick left portion, and a truncated conical inner ring which projects integrally, inclinedly, and inwardly from a right end surface of the thick left portion of the outer ring and which has a smallest inner diameter right end that is sleeved slidably over the left portion of the bearing retention member adjacent to the inner shoulder such that the flexible seal member isolates hermetically the annular space with respect to the bearing unit.

Preferably, the right end of the inner ring of the flexible seal member has an inner diameter, when removed from the bearing retention member, that is slightly smaller than an outer diameter of a section of the left portion of the bearing retention member, on which the right end of the inner ring is sleeved.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
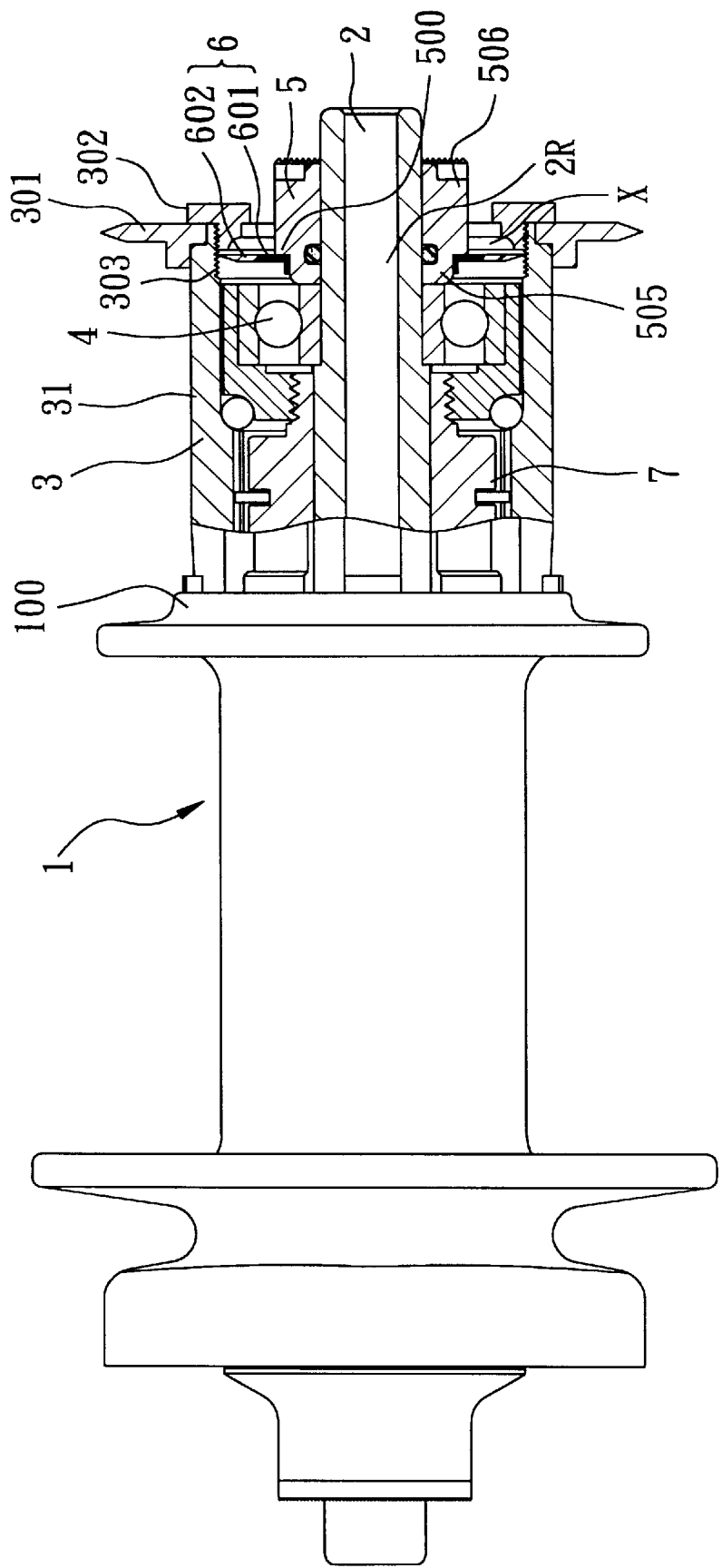
FIG. 1 is a schematic partly sectional view of a conventional bicycle hub transmission mechanism.
Figure 2:
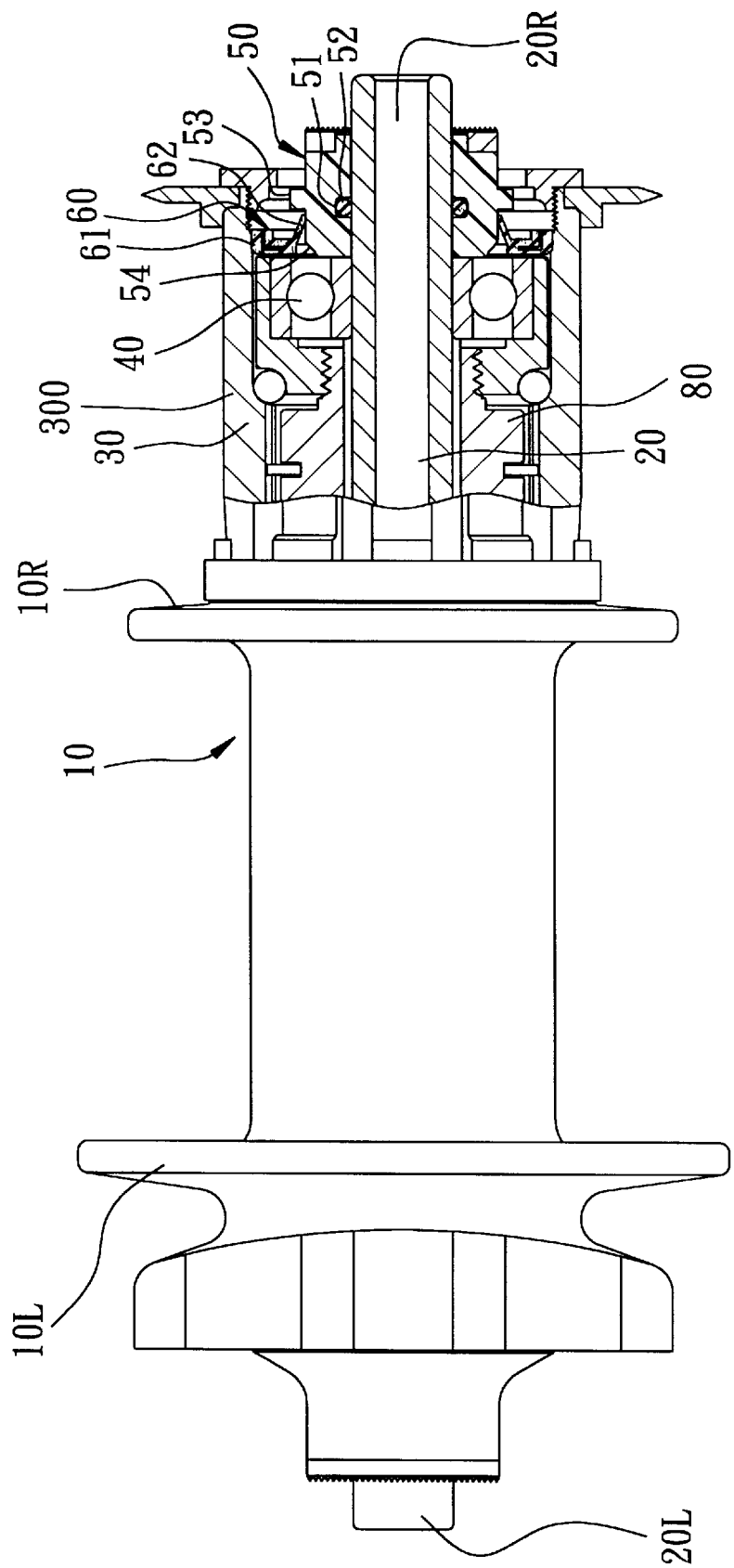
FIG. 2 is a schematic partly sectional view of the preferred embodiment of a bicycle hub transmission mechanism of the present invention.
Figure 3:
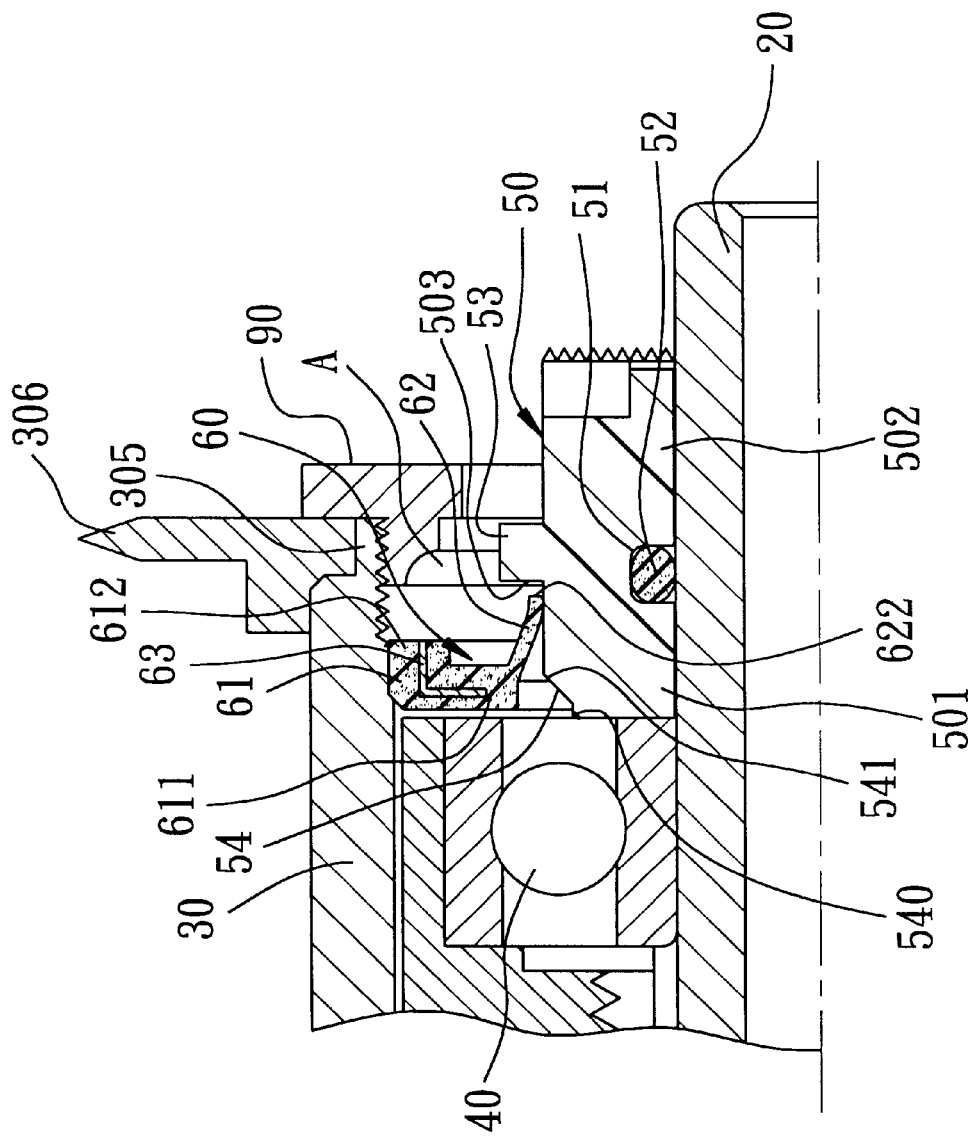
FIG. 3 shows a portion of the preferred embodiment, illustrating how a flexible seal member is mounted in a sprocket-mounting member between a bearing unit and a bearing retention member.

Referring to FIGS. 2 and 3, the preferred embodiment of a bicycle hub transmission mechanism of the present invention is shown to include an axle 20 with left and right axle portions 20L, 20R, a tubular spoke-mounting barrel 10, and a sprocket-mounting member 30.

As illustrated, the spoke-mounting barrel 10 defines an axially extending through-hole and has left and right end portions 10L, 10R. The axle 20 extends co-axially through the through-hole of the spoke-mounting barrel 10 with the right axle portion 20R projecting outwardly from the right end portion 10R of the spoke-mounting barrel 10.

The sprocket-mounting member 30 is sleeved around the right axle portion 20R of the axle 20 adjacent to the right end portion 10R of the spoke-mounting barrel 10, and includes an outer shell 300, a bearing unit 40, a ratchet mechanism 80, a bearing retention member 50, a tubular flexible seal member 60, and a locking ring 90.

The outer shell 300 has a proximate end portion which is coupled with the right end portion 10R of the spoke-mounting barrel 10 in a known manner for synchronous rotation therewith and upon which a sprocket wheel 306 is mounted (only partly is shown), and a distal end portion 305. The bearing unit 40 is disposed within the outer shell 300 around the right axle 20R inboard to the distal end portion 305 of the outer shell 300. The ratchet mechanism 80 is disposed within the outer shell 300 inboard to the bearing unit 40, and is operably coupled with the outer shell 300 of the sprocket-mounting member 30 so as to permit synchronous rotation of the outer shell 300 with the spoke-mounting barrel 10 only in a forward direction. Since the structure of the ratchet mechanism 80 is not pertinent to the present invention, a detailed description of the same is omitted herein for the sake of brevity.

The bearing retention member 50 is sleeved around the right axle portion 20R outboard to the bearing unit 40. A rear fork member (not shown) abuts against a right end surface of the bearing retention member 50 so as to position the bearing retention member 50 on the axle 20, thereby preventing removal of the bearing retention member 50 from the axle 20. The bearing retention member 50 has a cross section smaller than that of the outer shell 300 so that an annular space (A) is defined between the outer shell 300 and the bearing retention member 50. The bearing retention member 50 further has a left portion 501 abutting against the bearing unit 40, a right portion 502 opposite to the left portion 501, and an annular outward flange 53 formed between the left and right portions 501, 502 of the bearing retention member 50. The outward flange 53 extends radially and outwardly into the annular space (A), defining an inner shoulder 503 in cooperation with the left portion 501 of the bearing retention member 50.

The locking ring 90 is disposed around the bearing retention member 50, and is fastened to the distal end portion 305 of the outer shell 300.

The flexible seal member 60 is disposed within the outer shell 300 between the bearing unit 40 and the outward flange 53 of the bearing retention member 50. The flexible seal member 60 includes an L-shaped cross-sectioned outer ring 61 which is in tight engagement with the outer shell 300 and which has a thick left portion 611 and a thin right portion 612 that is thinner than the thick left portion 611 and that has an inner diameter larger than that of the thick left portion 611, and a truncated conical inner ring 62 which projects integrally, inclinedly, and inwardly from a right end surface of the thick left portion 611 of the outer ring 61 and which has a smallest inner diameter right end 622 that is sleeved slidably over the left portion 501 of the bearing retention member 50 adjacent to the inner shoulder 503 such that the flexible seal member 60 isolates hermetically the annular space (A) with respect to the bearing unit 40.

Figure 4:
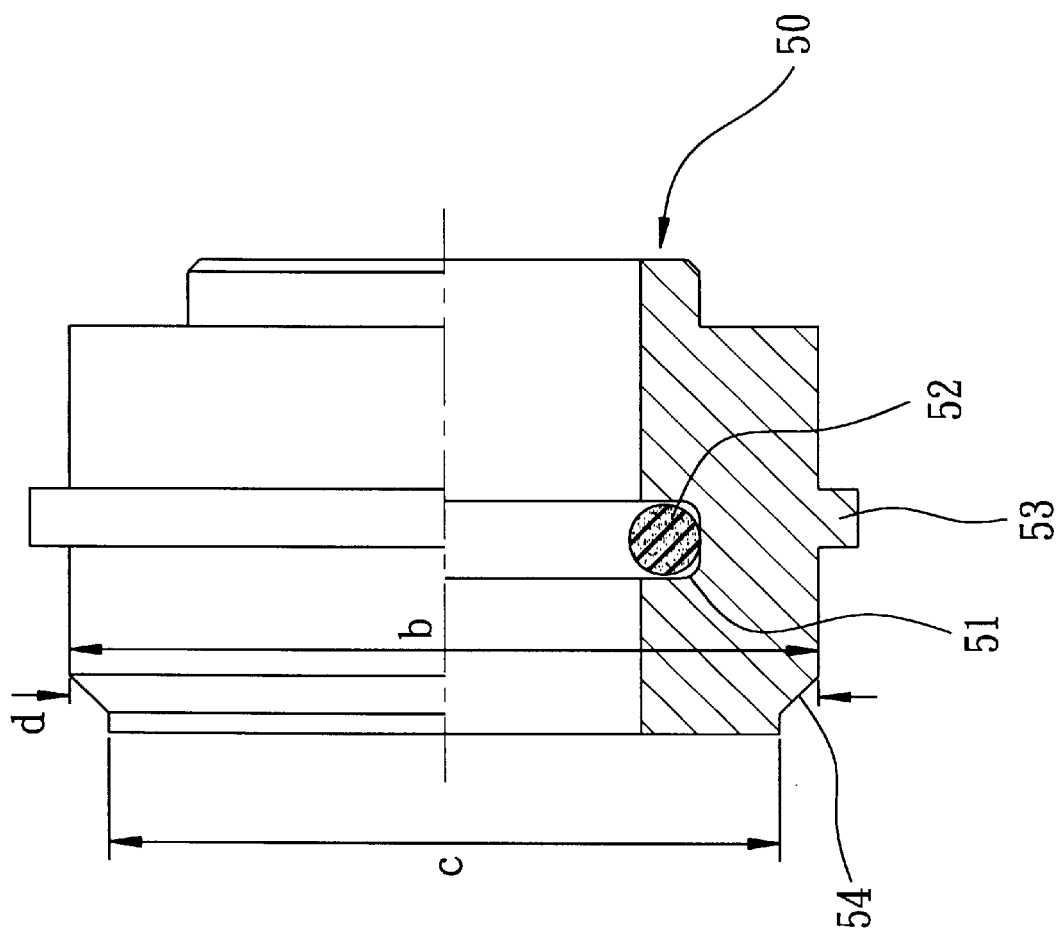
FIG. 4 is a schematic partly sectional view of the bearing retention member employed in the preferred embodiment.
Figure 5:
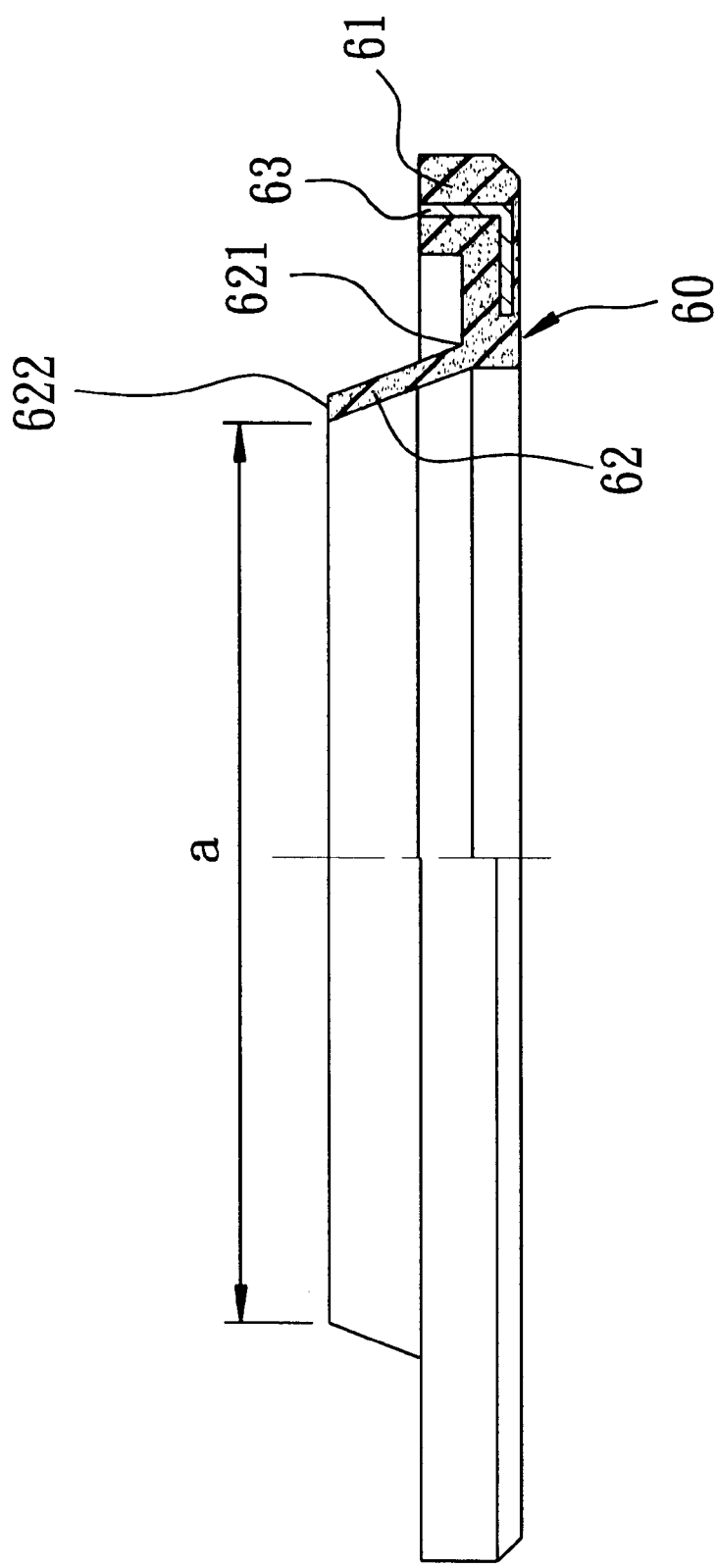
FIG. 5 is a schematic partly sectional view of the flexible seal member employed in the preferred embodiment.

As best shown in FIGS. 4 and 5, the right end 622 of the inner ring 62 has an inner diameter (a), when removed from the bearing retention member 50, that is slightly smaller than an outer diameter (b) of a section of the left portion 501 of the bearing retention member 50, on which the right end 622 of the inner ring 62 is sleeved. The bearing retention member 50 further includes a tapered left end portion 54 which has a left end 540 defining an outer diameter (c) that is smaller than the inner diameter (a) of the right end 622 of the inner ring 62, and a right end 541 defining an outer diameter (d) that is slightly larger than the inner diameter (a) of the right end 622 of the inner ring 62 so that the seal member 60 can be sleeved easily on the bearing retention member 50 from the left end 540 of the bearing retention member 50.

Preferably, a flexible rubber seal ring 52 is disposed in an annular recess 51 that is formed in an inner surface of the bearing retention member 50 such that a leak-proof effect is established between the axle 20 and the bearing retention member 50, thereby enhancing isolation of the seal member 60 with respect to the bearing unit 40. In addition, an L-shaped-cross-sectioned metal ring 63 is embedded within the outer ring 61 of the seal member 60 so as to reinforce rigidity of the same.

An important aspect to note is that the outer ring 61 of the seal member 60 is in tight engagement with the outer shell 300 while the inner ring 62 rests slidably on the left portion 501 of the bearing retention member 50. When the seal member 60 rotates synchronously with the outer shell 300, no clearance is formed therebetween. Because the seal member 60 contacts the bearing retention member 50 only at the right end 622, the friction therebetween is minimized during relative rotation. The object of the present invention is thus achieved.

With this invention thus explained, it is apparent that numerous modifications and variations can be made without departing from the scope and spirit of this invention. It is therefore intended that the invention be limited only as indicated in the appended claims.

I claim:

1. A hub transmission mechanism including:

an axle having left and right axle portions;

a tubular spoke-mounting barrel defining an axially extending through-hole therethrough and having left and right end portions, said axle extending co-axially through said through-hole with said right axle portion projecting outwardly from said right end portion of said spoke-mounting barrel; and a sprocket mounting member sleeved around said right axle portion of said axle adjacent to said right end portion of said spoke-mounting barrel, said sprocket mounting member including:

an outer shell having a proximate end portion that is coupled with said right end portion of said spoke-mounting barrel for synchronous rotation therewith and upon which a sprocket wheel is adapted to be mounted, and a distal end portion, a bearing unit disposed within said outer shell around said right axle portion inboard to said distal end portion of said outer shell, a ratchet mechanism disposed within said outer shell inboard to said bearing unit and operably coupled with said outer shell so as to permit synchronous rotation of said outer shell with said spoke-mounting barrel only in a forward direction, a bearing retention member sleeved and positioned around said right axle outboard to said bearing unit, said bearing retention member having a cross section smaller than that of said outer shell, thereby defining an annular space therebetween, said bearing retention member further having a left portion abutting against said bearing unit, a right portion opposite to said left portion, and an annular outward flange formed between said left and right portions of said bearing retention member and extending radially and outwardly into said annular space, thus defining an inner shoulder in cooperation with said left portion of said bearing retention member, and a tubular flexible seal member disposed within said outer shell between said bearing unit and said outward flange of said bearing retention member, said flexible seal member including an L-shaped cross-sectioned outer ring which is in tight engagement with said outer shell and which has a thick left portion and a thin right portion that is thinner than said thick left portion and that has an inner diameter larger than that of said thick left portion, and a truncated conical inner ring which projects integrally, inclinedly, and inwardly from a right end surface of said thick left portion of said outer ring and which has a smallest inner diameter right end that is sleeved slidably over said left portion of said bearing retention member adjacent to said inner shoulder such that said flexible seal member isolates hermetically said annular space with respect to said bearing unit.

2. The hub transmission mechanism as defined in claim 1, wherein said right end of said inner ring has an inner diameter, when removed from said bearing retention member, that is slightly smaller than an outer diameter of a section of said left portion of said bearing retention member, on which said right end of said inner ring is sleeved.

3. The hub transmission mechanism as defined in claim 2, wherein said bearing retention member includes a tapered left end portion which has a left end defining an outer diameter that is smaller than said inner diameter of said right end of said inner ring, and a right end defining an outer diameter that is slightly larger than said inner diameter of said right end of said inner ring so that said seal member can be sleeved on said bearing retention member from said left end of said bearing retention member.

4. The hub transmission mechanism as defined in claim 1, further comprising an L-shaped-cross-sectioned metal ring embedded within said outer ring of said seal member.

\* \* \* \* \*